United States Patent [19]

Miranti, Jr.

[11] Patent Number: 4,612,005

[45] Date of Patent: * Sep. 16, 1986

[54] TRANSVERSE BELT ELEMENTS FOR A BELT CONSTRUCTION

[75] Inventor: Joseph P. Miranti, Jr., Porter Township, Christian County, Mo.

[73] Assignee: Dayco Corporation, Dayton, Ohio

[*] Notice: The portion of the term of this patent subsequent to Jan. 15, 2001 has been disclaimed.

[21] Appl. No.: 771,181

[22] Filed: Sep. 3, 1985

Related U.S. Application Data

[60] Continuation of Ser. No. 646,265, Aug. 31, 1984, abandoned, which is a division of Ser. No. 436,745, Oct. 25, 1982, Pat. No. 4,493,679.

[51] Int. Cl.⁴ .............................................. F16G 5/00
[52] U.S. Cl. ........................................ 474/201; 474/244
[58] Field of Search .............. 474/201, 240, 242, 244, 474/245; 403/344, 313

[56] References Cited

U.S. PATENT DOCUMENTS

| | | | |
|---|---|---|---|
| 1,862,198 | 6/1932 | Reeves | 474/244 |
| 3,720,113 | 3/1973 | Van Doorne et al. | 474/242 |
| 3,895,878 | 7/1975 | Pitner | 403/344 |
| 3,917,424 | 11/1975 | Zugel | 403/344 X |
| 4,080,841 | 3/1978 | Vollers | 474/201 |
| 4,299,586 | 11/1981 | Van der Hardl Aberson | 474/201 |
| 4,303,403 | 12/1981 | Lamers | 474/201 |

FOREIGN PATENT DOCUMENTS

| | | | |
|---|---|---|---|
| 2414891 | 10/1975 | Fed. Rep. of Germany | 474/201 |
| 1066329 | 6/1954 | France | 474/201 |
| 256918 | 9/1948 | Switzerland | 474/201 |
| 2087032 | 5/1982 | United Kingdom | 474/201 |

*Primary Examiner*—James A. Leppink
*Assistant Examiner*—Thuy M. Bui
*Attorney, Agent, or Firm*—Joseph V. Tassone

[57] ABSTRACT

An endless power transmission belt and a transverse belt element therefor as well as methods of making the same are provided, the belt construction comprising an endless flexible carrier and a plurality of transverse belt elements assembled on the carrier, each belt element having a peripheral face and a medial slot passing therethrough and receiving part of the carrier therein. Each belt element has a slit in the peripheral face thereof that leads to the slot thereof and a hinge spaced from the slit thereof that permits the belt element to have the slit thereof opened sufficiently to permit at least part of the carrier to be received therethrough for subsequent positioning in the slot thereof and thereafter be moved to a closed position to prevent at least that part of the carrier from escaping through the slit.

5 Claims, 10 Drawing Figures

4,612,005

TRANSVERSE BELT ELEMENTS FOR A BELT CONSTRUCTION

This is a continuation of application Ser. No. 646,265, filed Aug. 31, 1984, now abandoned, which is also a division of application Ser. No. 436,745, filed Oct. 25, 1982, now U.S. Pat. No. 4,493,679, issued Jan. 15, 1985.

BACKGROUND OF THE INVENTION

1. Field of the Invention

This invention relates to an improved endless power transmission belt construction and to a transverse belt element therefor as well as to a method of making the belt construction.

2. Prior Art Statement

It is known to provide an endless power transmission belt construction comprising an endless flexible carrier means and a plurality of transverse belt elements assembled on the carrier means, each belt element having a peripheral face means and a medial slot passing therethrough and receiving part of the carrier means therein.

For example, see the U.S. Pat. No. 4,080,841 to Vollers, wherein each transverse belt element has the medial slot thereof defined by a bottom surface of the belt element and a pair of upstanding side parts thereof interconnected together by a pin passing therethrough and spaced from the bottom surface to completely close the slot means on all four sides thereof and in which the carrier means is disposed.

Other examples of transverse belt elements are provided in the U.S. Pat. No. 3,720,113; to Doorne et al; the U.S. Pat. No. 4,299,586 to Aberson, and the U.S. Pat. No. 4,303,403 to Lamers, wherein each transverse belt element has an opening leading to the medial slot means thereof and through which the carrier means can be readily removed and inserted.

SUMMARY OF THE INVENTION

It is one feature of this invention to provide an improved endless power transmission belt construction which is particularly adapted to be utilized for continuous variable transmission purposes and the like.

In particular, it was found according to the teachings of this invention that each transverse belt element for such an endless power transmission belt construction can have a slit means in the peripheral face means thereof and through which at least part of the carrier means can be received so as to be subsequently disposed in the medial slot means thereof, the belt element having a hinge means spaced from the slit means to permit the slit means thereof to be opened sufficiently to receive at least that part of the carrier means therethrough and thereafter be moved to a closed position to prevent at least that part of the carrier means from escaping through the slit means.

For example, one embodiment of this invention provides an endless power transmission belt construction comprising an endless flexible carrier means and a plurality of transverse belt elements assembled on the carrier means, each belt element having a peripheral face means and a medial slot means passing therethrough and receiving part of the carrier means therein. Each belt element has a slit means in the peripheral face means thereof that leads to the slot means thereof and a hinge means spaced from the slit means thereof that permits the belt element to have the slit means thereof opened sufficiently to permit at least part of the carrier means to be received therethrough for subsequent positioning in the slot means thereof and thereafter to be moved to a closed position to prevent at least that part of the carrier means from escaping through the slit means.

Accordingly, it is an object of this invention to provide an improved power transmission belt construction having one or more of the novel features of this invention as set forth above or hereinafter shown or described.

Another object of this invention is to provide an improved method of making such a power transmission belt construction, the method of this invention having one or more of the novel features of this invention as set forth above or hereinafter shown or described.

Another object of this invention is to provide an improved transverse belt element for such a power transmission belt construction or the like, the transverse belt element of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
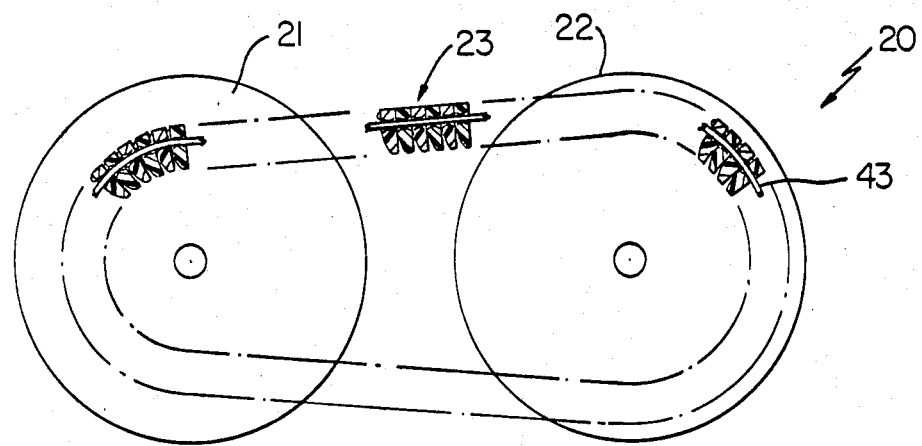
FIG. 1 is a schematic side view of a transmission means with parts in section, the transmission means including the improved endless power transmission belt construction of this invention.

While the various features of this invention are hereinafter illustrated and described as providing an endless power transmission construction particularly adapted to be utilized for continuous variable transmission purposes, it is to be understood that the various features of this invention can be utilized singly or in any combination thereof to provide a belt construction for other uses as desired.

Therefore, this invention is not to be limited to only the embodiments illustrated in the drawings, because the drawings are merely utilized to illustrate one of the wide variety of uses of this invention.

Referring now to FIG. 1, a conventional continuously variable transmission arrangement is generally indicated by the reference numeral 20 and comprises a pair of rotatable pulleys 21 and 22, one of which is to be driven by the other thereof by means of an endless power transmission belt construction of this invention that is generally indicated by the reference numeral 23 and which operates in a manner conventional in the art, the pulleys 21 and 22 having variable diameters in a manner well known in the art whereby a continuously variable transmission is provided by the arrangement 20 in a manner well known in the art and as set forth in the aforementioned four U.S. patents which four U.S. patents are being incorporated into this disclosure by this reference thereto.

Since the operation of a continuously variable power transmission arrangement is well known in the art, a further description of the arrangement 20 need not be set forth as the features of this invention are directed to the endless power transmission belt 23 and will now be described.

The endless belt construction 23 of this invention comprises an endless carrier means that is generally indicated by the reference numeral 24, FIGS. 2–7 and a plurality of transverse belt elements 25 carried by the carrier means 24 in a manner hereinafter set forth.

Figure 4:
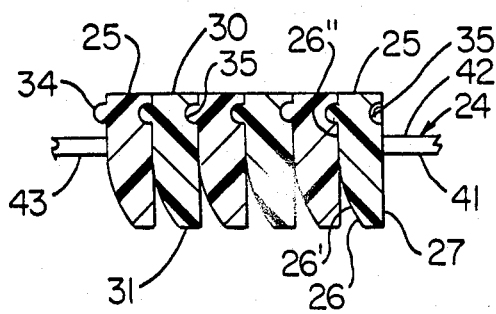
FIG. 4 is a fragmentary cross-sectional view taken on line 4—4 of FIG. 3.
Figure 5:
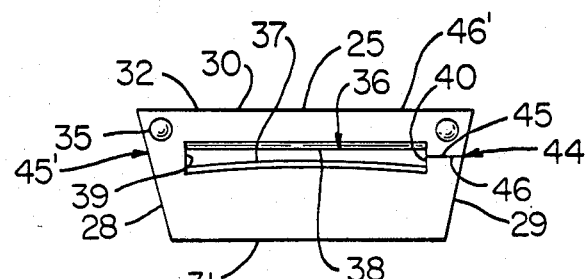
FIG. 5 is a front view of one of the transverse belt elements of the belt construction of FIGS. 1–4 before the same is assembled to a carrier means of the belt construction of FIGS. 1–4.

Each transverse belt element 25 of this invention is substantially trapezoidal in the configuration when viewed in the manner illustrated in FIG. 5 and has a front face 26 and a rear face 27 as well as opposed side faces 28 and 29 with the side faces 28 and 29 being angled relative to each other to give a substantially "V" shape to each belt element 25. Each belt element 25 also has a top face or side 30 and a bottom face or side 31 which are disposed substantially parallel to each other and are substantially flat as illustrated in FIG. 4 while the front face 26 is substantially arcuate in the lower portion 26' thereof while being substantially flat in the top portion 25" thereof and substantially parallel with the flat rear face 27.

The side faces 28 and 29 and bottom and top faces 31 and 30 of each belt element 25 define an outer peripheral face means 32 of the respective belt element 25.

The front face 26 of each belt element 25 is provided with a plurality of outwardly extended substantially rounded projections 34 in the top portion 26" thereof which are adapted to be respectively received in a plurality of like-shaped recesses 35 formed in the rear surface 27 of the transverse belt element adjacent thereto in the manner illustrated in FIG. 4 and as fully set forth in the aforementioned U.S. Pat. No. 4,303,403 whereby the details of the projections 34 and recesses 35 and their operation need not be further described.

Figure 2:
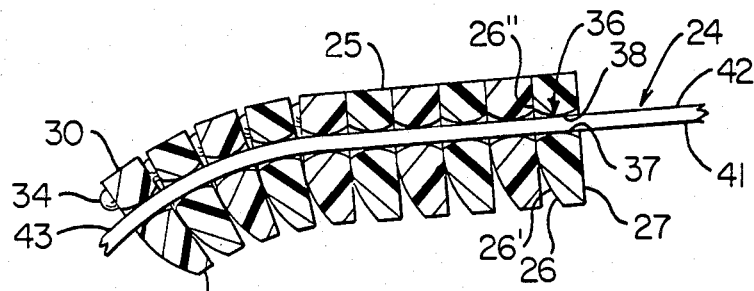
FIG. 2 is an enlarged cross-sectional view of a portion of the endless power transmission belt construction of FIG. 1.
Figure 3:
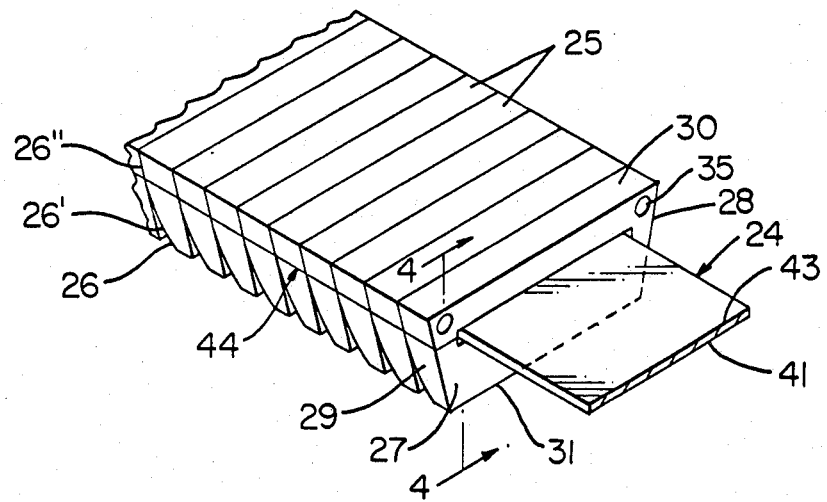
FIG. 3 is a fragmentary perspective view of part of the belt construction of FIG. 2.

Each belt element 25 has a medial slot means that is generally indicated by the reference numeral 36 in FIG. 5 passing transversely therethrough intermediate the opposed side faces 28 and 29 as well as intermediate the opposed top and bottom faces 30 and 31 as illustrated in FIG. 5, the slot means 36 defining a bottom surface 37 of the slot means 36 which is substantially bowed or arcuate in the manner illustrated in FIG. 5 as well as transversely bowed or arcuate as illustrated in FIG. 2. The top surface 38 of the belt element 25 that is defined by the slot 36 is substantially straight when viewed in FIG. 5 and is arcuate in transverse cross section as illustrated in FIG. 2 while the opposed ends 39 and 40 of the belt element 25 that are defined by the slot 36 are substantially straight and parallel to each other as illustrated in FIG. 5.

The carrier means 24 is adapted to be received in the slot means 36 of each transverse belt element 25 in a manner hereinafter set forth so that the bottom surface means 41 of the carrier means 24 is disposed against the bottom surface 37 of each transverse belt element 25 as illustrated in FIG. 2 while the top surface 42 thereof can be spaced below the top surface 38 of each transverse belt element 25 or be disposed in contact therewith as desired.

While the carrier means 24 for the belt construction 23 of this invention is illustrated as being a single flat metallic band 43, it is to be understood that the carrier means 24 could comprise a plurality of endless flat metallic bands as illustrated and described in the aforementioned U.S. Pat. No. 3,720,113 and as illustrated in FIG. 9 wherein another belt construction of this invention is generally indicated by the reference numeral 23A and wherein parts thereof similar to the belt construction 23 previously described are indicated by like reference numerals followed by the reference letter "A".

Figure 9:
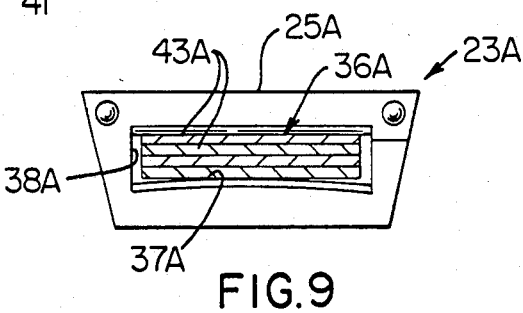
FIG. 9 is a view similar to FIG. 7 and illustrates another belt construction of this invention.

As illustrated in FIG. 9, each transverse belt element 25A has the slot means 36A thereof formed substantially deeper than the slot means 36 previously described so that the same can recieve a plurality of endless flat metallic bands 43A disposed in superimposed relation upon each other whereby the bottom flat band 43A engages the bottom surface 37A while the top flat band 43A engages or is spaced from the top surface 38A as illustrated in FIG. 9.

Therefore, it can be seen that the carrier means 24 of this invention can comprise one or more endless flat bands 43 while each transverse belt element 25 of this invention is adapted to operate therewith in a manner hereinafter set forth.

Each belt element 25 of this invention is provided with a slit means that is generally indicated by the reference numeral 44 with the slit means 44 interrupting the side face 29 thereof and leading to the slot means 36 as illustrated in FIG. 5, the slit means 44 defining opposed substantially flat surfaces 45 and 46 of the belt element 25 which are adapted to be disposed against each other as illustrated in FIG. 5 to completely close the slit means 44. However, the slit means 44 is adapted to be opened in the manner illustrated in FIG. 6 in a manner hereinafter set forth to permit the carrier means 24 to be inserted through the opened slit means 44 and be disposed in the slot means 36 by either causing transverse movement of the belt element 25 relative to the carrier means 24, transverse movement of the carrier means 24 relative to the belt element 25, or transverse movement of both the belt element 25 and carrier means relative to each other.

In order to permit the opening and closing of the slit means 44 in the manner previously set forth, the opposed side faces 28 in the region of the reference numeral 45' can provide a hinge means for such opening and closing action. Of course, the actual bending or flexing of the belt element 25 to effect the opening and closing of the slit means 44 can take place anywhere along the arm 46' which is defined by the part of the belt element 25 intermediate the top surface 38 of the slit means 36 in the top surface 30 of the element 25 so that the hinge means 45' can be in the arm 46' rather than in the side face 28. Such location of the hinge means 45' therefor depends upon the thickness of the material between the side face 28 and the adjacent side 39 of the slot 36 in relation to the thickness of the arm 46' between the surfaces 30 and 38, etc.

Figure 7:
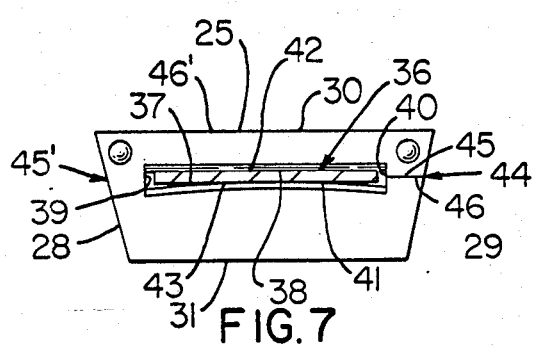
FIG. 7 is a view similar to FIG. 6 and illustrates another step in the assembly method of this invention.

In any event, it can be seen that the hinge means 45' is spaced from the slit means 44 and that the natural resiliency of the belt element 25 is such that the same permits the arm 46' to be raised upwardly at the right hand end thereof to open the slit means 44 with the belt element 25 having a sufficient natural resiliency at the hinge means 45' thereof to tend to close the slit means 44 in the manner illustrated in FIGS. 5 and 7 when the arm 46' is released.

For example, the belt element 25 can be formed from a suitable polymeric material, metallic material, or be a composite of materials that have sufficient elasticity to permit opening and closing of the slit means thereof and still be formed as a one-piece member. However, it is to be understood that the hinge means for opening and closing the slit means 44 could be a separate part if desired.

Figure 6:
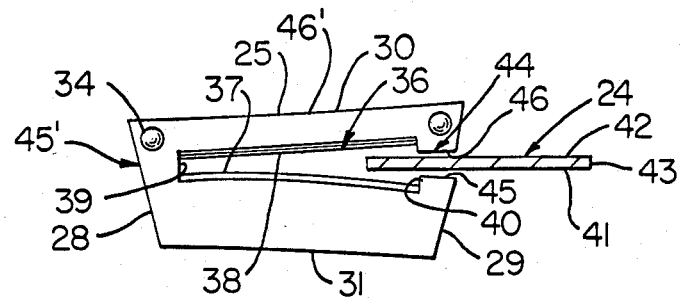
FIG. 6 is a view similar to FIG. 5 and illustrates one step in the method of this invention for inserting the carrier means of the belt construction of FIGS. 1–4 in the belt element of FIG. 5.

In any event, it can be seen that the slit means 44 of the belt element 25 can be opened sufficiently in the manner illustrated in FIG. 6 to permit at least one band 43 of the carrier means 24 to be inserted therein, the belt element 25A of FIG. 9 permitting at least one belt element 43A to be inserted therein so that a plurality of belt elements 43A can be disposed in sequence in the slot means 36A as illustrated in FIG. 9.

After the carrier means 24 has been inserted through the opened slit means 44 in the manner previously described, the arm 46' is released and the natural resilience of the belt element 25 permits the belt element 25 to close the slit means 44 and thereby capture the carrier means 24 completely within the slot means 36 thereof as the surfaces 45 and 46 of the belt element 25 are held against each other by the natural resilience of the belt element 25.

However, it is to be understood that auxiliary securing means can be utilized to securely the surfaces 45 and 46 of each slit means 44 in their closed position once the carrier means 24 has been received in the slot means 36 thereof.

For example, such auxiliary securing means could comprise adhesive means, welding means, etc. for securing the surfaces 45 and 46 together.

Figure 8:
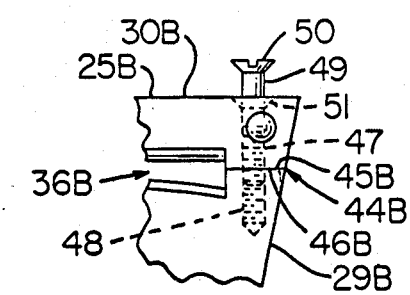
FIG. 8 is an enlarged fragmentary front view of another belt element of this invention.

In particular, reference is made to FIG. 8 wherein another belt element of this invention is indicated by the reference numeral 25B and parts thereof similar to the belt element 25 previously described are indicated by like reference numerals followed by the reference letter "B".

As illustrated in FIG. 8, the belt element 25B has a transverse bore 47 interrupting the top face or side 30B thereof and passing through the adjacent surfaces 45B and 46B with at least the lower portion 48 of the bore 47 being threaded so that a threaded fastening member 49 can be disposed in the bore 47 and have its enlarged head 50 received in a recess 51 formed in the top surface 30B when the fastening member 49 is fully threaded into the bore to hold the two surfaces 45B and 46B securely together once the carrier band 43 has been disposed in the slot means 36B thereof in the manner previously described.

If desired, suitable friction material can be disposed on the opposed faces 28 and 29 of each belt element 25 of this invention.

Figure 10:
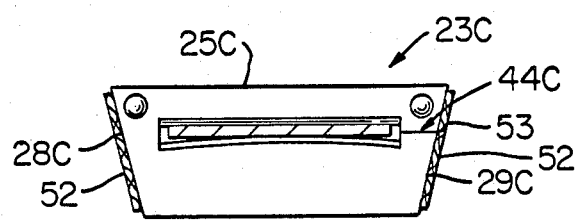
FIG. 10 is a view similar to FIG. 7 and illustrates another belt construction of this invention.

For example, reference is now made to FIG. 10 wherein another belt construction of this invention is generally indicated by the reference numeral 23C and parts thereof similar to the belt elements 25, 25A and 25B previously described are indicated by like reference numerals followed by the reference letter "C".

As illustrated in FIG. 10, friction material 52 that is conventional in the art is secured to the opposed side faces 28C and 29C of the belt element 25C.

If desired, the friction material 52 that is secured to the side face 29C of the belt element 25C could be split, such as at the reference numeral 53, to permit the slit means 44C to be opened and closed in the manner previously set forth or the friction material 52 can be secured to the side face 29C after the belt element 25C has been assembled on the carrier means 24C so that the friction material 52 on the side 29C would perform the function of holding the slit means 44C in its closed position.

Therefore, it can be seen that each belt element of this invention is adapted to be assembled to an endless carrier means for forming therewith an endless power transmission belt construction by having a slit means formed in the peripheral face means thereof and be opened sufficiently to permit at least part of that carrier means to be inserted therethrough into a medial slot means of the belt element with the slit means subsequently being closed to hold at least that part of the carrier means in the medial slot means of the belt element, such opening and closing of the slit means being provided by a hinge means of the belt element that is disposed spaced from the slit means thereof.

Accordingly, it can be seen that this invention not only provides an improved endless power transmission belt construction and method of making the same, but also this invention provides an improved transverse belt element therefor or the like.

While the forms and methods of this invention now preferred have been illustrated and described as required by the Patent Statute, it is to be understood that other forms and method steps can be utilized and still fall within the scope of the appended claims.

What is claimed is:

1. In a transverse belt element for an endless power transmission belt construction comprising an endless flexible carrier means and a plurality of said transverse belt elements assembled on said carrier means, said belt element having peripheral face means and a medial slot means passing therethrough for receiving part of said carrier means therein, said belt element having a slit means in said peripheral face means thereof originating in a side face thereof that leads to said slot means thereof and a hinge means in an opposed side face thereof spaced from said slit means that permits said belt element to have said slit means thereof opened sufficiently to permit at least part of said carrier means to be received therethrough for subsequent positioning in said slot means thereof and thereafter be moved to a closed position to prevent at least that part of said carrier means from escaping through said slit means, said belt element having two adjacent surfaces defining said slit means therebetween, the improvement wherein said belt element has fastening means for securing said adjacent surfaces thereof against each other so that said slit means thereof is maintained in said closed position.

2. A belt element as set forth in claim 1 wherein said hinge means of said belt element has a natural tendency to hold said slit means thereof in its said closed condition thereof.

3. A belt element as set forth in claim 2 wherein said belt element is a one-piece member and has a natural resiliency that causes said hinge means thereof to tend to hold said slit means in its said closed condition thereof.

4. A belt element as set forth in claim 1 wherein said belt element is at least partially formed from polymeric material.

5. A belt element as set forth in claim 1 wherein said adjacent surfaces of said belt element have a transverse bore passing therethrough that defines said fastening means thereof.

* * * * *